(12) United States Patent
Freyensee et al.

(10) Patent No.: US 9,910,786 B2
(45) Date of Patent: Mar. 6, 2018

(54) EFFICIENT REDUNDANT ARRAY OF INDEPENDENT DISKS (RAID) WRITE HOLE SOLUTIONS

(71) Applicant: Intel Corporation, Santa Clara, CA (US)

(72) Inventors: James P. Freyensee, Hillsboro, OR (US); Sanjeev N. Trika, Portland, OR (US); Bryan E. Veal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/931,410

(22) Filed: Nov. 3, 2015

(65) Prior Publication Data

US 2017/0123995 A1    May 4, 2017

(51) Int. Cl.
*G06F 11/00* (2006.01)
*G06F 12/10* (2016.01)
(Continued)

(52) U.S. Cl.
CPC .......... *G06F 12/10* (2013.01); *G06F 11/1076* (2013.01); *G06F 11/2094* (2013.01);
(Continued)

(58) Field of Classification Search
CPC ..................................................... G06F 12/10
(Continued)

(56) References Cited

U.S. PATENT DOCUMENTS

| | | | |
|---|---|---|---|
| 5,235,601 A * | 8/1993 | Stallmo | G06F 11/1435 714/6.21 |
| 5,774,643 A | 6/1998 | Lubbers et al. | |

(Continued)

FOREIGN PATENT DOCUMENTS

WO    2012/142027 A2    10/2012

OTHER PUBLICATIONS

Morgan, Timothy P., "Intel Shows Off 3D XPoint Memory Performance," The Platform, pp. 1-5, accessed at http://www.theplatform.net/2015/10/28/intel-shows-off-3d-xpoint-memory-performance/ on Oct. 29, 2015.

(Continued)

*Primary Examiner* — Dieu-Minh Le
(74) *Attorney, Agent, or Firm* — Lowenstein Sandler LLP

(57) ABSTRACT

Disclosed are solutions for resolving a redundant array of independent disks (RAID) write hole, or a parity-based fault scenario that occurs when a power failure and a drive failure occur at or close to the same time. Drive array controller logic assigns a sequence number to write operations received from a computing system and converts respective write operations, including corresponding sequence numbers, to a multiple-drive write to a series of RAID drives. A microcontroller at each drive writes, to a history log (HLOG) on the drive, a logical-to-physical address mapping of a prior sector of the drive that was written along with a corresponding sequence number. Upon receipt of a new write to the mapped logical address, the microcontroller removes the HLOG entry for the logical address, and writes a new entry to the HLOG with a new physical address mapping to the logical address with a new sequence number.

25 Claims, 13 Drawing Sheets

(51) Int. Cl.
*G06F 11/10* (2006.01)
*G06F 11/20* (2006.01)

(52) U.S. Cl.
CPC ............ *G06F 2201/805* (2013.01); *G06F 2212/1032* (2013.01); *G06F 2212/1041* (2013.01); *G06F 2212/205* (2013.01); *G06F 2212/262* (2013.01); *G06F 2212/65* (2013.01)

(58) Field of Classification Search
USPC ............... 714/6.24, 6.2, 6.22, 6.23, 11–12
See application file for complete search history.

(56) References Cited

U.S. PATENT DOCUMENTS

| | | | |
|---|---|---|---|
| 5,778,426 A * | 7/1998 | DeKoning | G06F 11/1076 711/114 |
| 7,636,814 B1 | 12/2009 | Karr et al. | |
| 7,779,294 B2 | 8/2010 | Corrado et al. | |
| 8,443,153 B1 | 5/2013 | Edwards et al. | |
| 8,631,201 B2 * | 1/2014 | Koshiyama | G06F 3/0607 711/114 |
| 9,141,299 B2 | 9/2015 | Grimsrud et al. | |
| 9,274,720 B1 | 3/2016 | Ori | |
| 9,348,758 B2 * | 5/2016 | Pignatelli | G06F 12/1009 |
| 9,471,448 B2 | 10/2016 | Williams et al. | |
| 9,489,150 B2 * | 11/2016 | Aszmann | G06F 3/0689 |
| 2002/0091903 A1 | 7/2002 | Mizuno | |
| 2002/0161970 A1 | 10/2002 | Busser | |
| 2003/0196052 A1 | 10/2003 | Bolik et al. | |
| 2004/0093463 A1 * | 5/2004 | Shang | G06F 11/1076 711/113 |
| 2010/0114847 A1 | 5/2010 | Giampaolo et al. | |
| 2013/0332655 A1 | 12/2013 | Kandiraju et al. | |

OTHER PUBLICATIONS

Lawson, Stephen, "Intel, Micron Claim a New Class of Memory between Flash and DRAM," CIO, pp. 1-4, accessed at http://www.cio.com/article/2953753/intel-micron-claim-a-new-class-of-memory-between-flash-and-dram.html on Aug. 27, 2015.

Halfacree, Gareth, "Intel Pledges 2016 Launch for 3D XPoint-Based Optane," 2pgs, accessed at http://www.bit-tech.net/news/hardware/2015/08/19/intel-optane/1/ on Aug. 27, 2015.

"Intel Solid-State Drives in Server Storage Applications," White Paper, pp. 1-24 (Feb. 2014).

International Search Report and Written Opinion for International Application No. PCT/US2015/060478, 14 pages, dated Mar. 31, 2016.

Avago Technologies, "Storage Solutions Product Guide," Avago Technologies, 12 pages, 2013-2014.

Bonwick, J., "RAID-Z," https://blogs.oracle.com/bonwick/entry/raid_Z, 5 pages, Nov. 17, 2005, Retrieved on Nov. 9, 2014.

"Closing the RAID5 Write Hole," http://neil.brown.name/blog/20110614101708, 9 pages, Jun. 14, 2011, Retrieved on Dec. 10, 2014.

LSI Corporation, "LSI Product Brief," by LSI Corporation, 2 pages, 2013.

Rodeh, O., "B-Trees, Shadowing, and Clones," IBM Haifa Research Labs, ACM Transactions on Computational Logic, vol. V, No. N, 26 pages, Aug. 2007.

Rodeh O., "B-Trees, Shadowing, and Clones," 51 pages, Feb. 2008.

Sanapptx, "RAID-Z," http://sanapptx.com/resources/why-zfs/raid-z/>, 1 page, 2014.

* cited by examiner

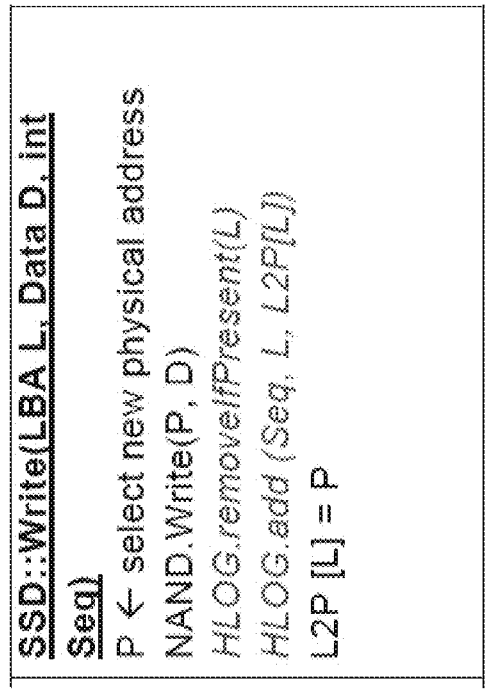
FIG. 4
SSD::Write(LBA L, Data D, int Seq)
P ← select new physical address
NAND.Write(P, D)
*HLOG.removeIfPresent(L)*
*HLOG.add (Seq, L, L2P[L])*
L2P [L] = P
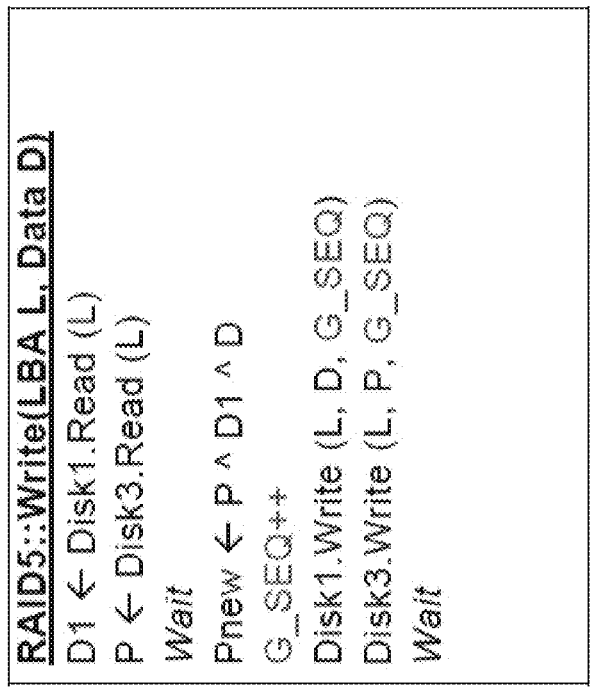
FIG. 3
RAID5::Write(LBA L, Data D)
D1 ← Disk1.Read (L)
P ← Disk3.Read (L)
*Wait*
Pnew ← P ^ D1 ^ D
G_SEQ++
Disk1.Write (L, D, G_SEQ)
Disk3.Write (L, P, G_SEQ)
*Wait*
| Seq# | L | Old_P |
|------|----|-------|
| 346  | 16 | 4020  |
| 349  | 24 | 0048  |
| 428  | 8  | 2072  |
FIG. 2

```
SSD::DefragBlock(Block B)
For all pages P in B
    DefragPage (P)
End for
Erase B SSD::DefragPage(P)
If (IsCurrent (P))
    P2 ← select new phys address
    NAND.Write (P2, Data from P)
    L2P[L] = P2
Else if (HLOG.contains (P))
    P2 ← select new phys address
    NAND.Write (P2, Data from P)
    Update HLOG entry P->P2
End if
```

FIG. 5

RAID5::RwhRecovery
1. Let:
   - J = Current RAID drive being recovered
   - Q = list of recently (active) written stripes assembled from pulling the HLOGs of all drives in the RAID system. Parity could be potentially inconsistent on these stripes.
   - L = current RAID data stripe entry in Q being analyzed
   - $SEQ_p$ = The sequence number of L on the parity drive
   - $SEQ_i$ = The sequence number of L on Data Drive *i*
   - NONE = a sequence number that is *not* found in the HLOG of a RAID drive member. (This would mean data has not been written to that drive in a very long time).
   - *Data Drive i* = one of the remaining RAID drives in the system that is *not* the parity drive and is *not* the failed drive J 2. For each stripe L in Q:
   a. If (RAID drive J is not a parity drive for stripe L)
      i. $SEQ_p$ = (Parity drive for stripe L).GetSequenceNum(L)
      ii. For stripe L, for each *Data Drive i* where *i* != J:
         1. $SEQ_i$ = (*Data drive i*).GetSequenceNum(L)

iii. Where *Data drive i* != J,
         If ($SEQ_p$ != NONE)
           and
           ($SEQ_p$ > all $SEQ_i$ that are *not* NONE)
            1. $(Data)_p$ = (Parity drive for stripe L).ReadOldData(L)
      iv. Else
            1. $(Data)_p$ = (Parity drive for stripe L).Read(L)

v. For stripe L, for each *Data Drive i* where *i* != J:
            1. If ($SEQ_i$ == NONE)
                 or
                 (($SEQ_p$ != NONE) and ($SEQ_i$ <= $SEQ_p$))
               a. $(Data)_i$ = $Disk_i$.Read(L)
            2. Else
               a. $(Data)_i$ = $Disk_i$.ReadOldData(L)

vi. $(Data)_{recovered}$ of Drive= XOR ($(Data)_p$, XOR (all $(Data)_i$ where *i* != J))
      vii. Write to Drive J (L, $(Data)_{recovered}$) (i.e. Write the recovered Data of Drive J to Drive J for stripe L)

FIG. 6A

```
    b. Else (RAID drive J is a parity drive for stripe L)
        i. Recompute and write parity to the parity drive for stripe L
           (i.e., XOR the strips in data drives to compute (Data)_u for
           stripe L).

SSD::GetStateSeq (LBA L)
    1. If (HLOG.includes (L))
        a. Return (HLOG entry for L).Seq
    2. Else: Return (NONE)

// The following function returns the data at L, as it was before the last write,
// assuming that the LBA was written recently, i.e., is present in HLOG.
SSD::ReadOld (LBA L)
    1. P = (HLOG entry for L).OldP
    2. Return (NAND.Read (P))
```

FIG. 6B

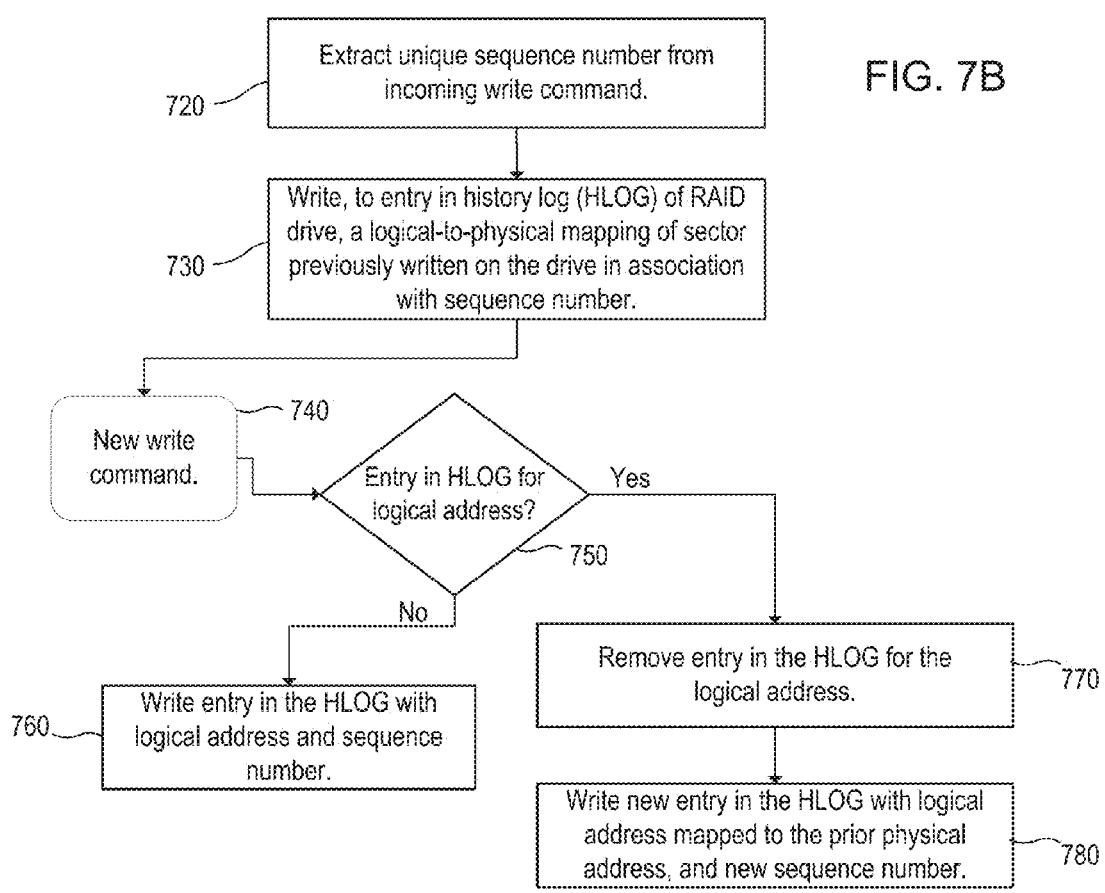

EFFICIENT REDUNDANT ARRAY OF INDEPENDENT DISKS (RAID) WRITE HOLE SOLUTIONS

The present disclosure pertains to the field of non-volatile storage and, in particular, to providing efficient and cost-effective solutions to a redundant array of independent disks (RAID) write hole effect.

BACKGROUND

A Redundant Array of Independent Disks (RAID) combines a plurality of physical disk drives into a logical drive for purposes of reliability, capacity, or performance. Instead of multiple physical disk drives, an operating system sees the single logical drive. As is well known to those skilled in the art, there are many standard methods referred to as RAID levels for distributing data across the physical hard disk drives in a RAID system.
For example, a level 5 RAID system provides a high level of redundancy by striping both data and parity information across at least three hard disk drives. Data striping is combined with distributed parity to provide a recovery path in case of failure.

In RAID technology, strips of a drive can be used to store data. A strip is a range of logical block addresses (LBAs) written to a single disk drive in a parity RAID system. A RAID controller may divide incoming host writes into strips of writes across the member drives. A stripe is a set of corresponding strips on each member drive in the RAID volume. In an N-drive RAID 5 system (where N is three or greater), for example, each stripe contains N−1 data-strips and one parity strip. A parity strip may be the exclusive OR (XOR) of the data in the other strips in the stripe, and the drive that stores the parity for the stripe may be rotated per-stripe across the member drives. Parity may be used to restore data on a drive of the RAID system should the drive fail, become corrupted or lose power. Different algorithms may be used that, during a write operation to a stripe, calculate partial parity that is an intermediate value for determining parity.

A RAID write hole (RWH) event is a fault scenario that occurs when a power failure (or system crash) and a drive failure (e.g., strip read or drive crash) occur at the same time or close in time to each other. The RWH event is related to a parity-based RAID system. These system crashes and drive failures are often correlated events. These crashes and drive failures can lead to silent data corruption or irrecoverable data due to a lack of atomicity of write operations across member drives in a parity-based RAID system. Due to the lack of atomicity, the parity of an active stripe during a power failure may be incorrect in that the active stripe becomes inconsistent with the rest of the strip data across the active stripe. The data on such inconsistent stripes does not have the desired protection, and worse, can lead to incorrect corrections, which may create silent data errors within a parity-based RAID system.

BRIEF DESCRIPTION OF THE DRAWINGS

FIG. 2 is a table depicting a history log (HLOG) according to one embodiment of the present disclosure.
FIG. 3 is pseudocode for generating a RAID 4 or a RAID 5 write according to one embodiment of the present disclosure.
FIG. 4 is pseudocode for updating an HLOG on a RAID drive upon receipt of a RAID 5 write according to one embodiment.
FIG. 5 is pseudocode for defragmenting a RAID drive using HLOG entries according to one embodiment of the present disclosure.
FIGS. 6A and 6B are pseudocode of read-write-hole recovery for a RAID 4-controlled or a RAID 5-controlled array using HLOGs stored on respective drives of the RAID system according to one embodiment.
FIG. 7A is a flowchart of a method for a drive array controller to issue write commands with sequence numbers according to one embodiment.
FIG. 7B is a flowchart of a method for using the sequence numbers issued in the method of FIG. 7A to update an HLOG on respective RAID drives according to one embodiment.

DESCRIPTION OF EMBODIMENTS

Figure 1A:
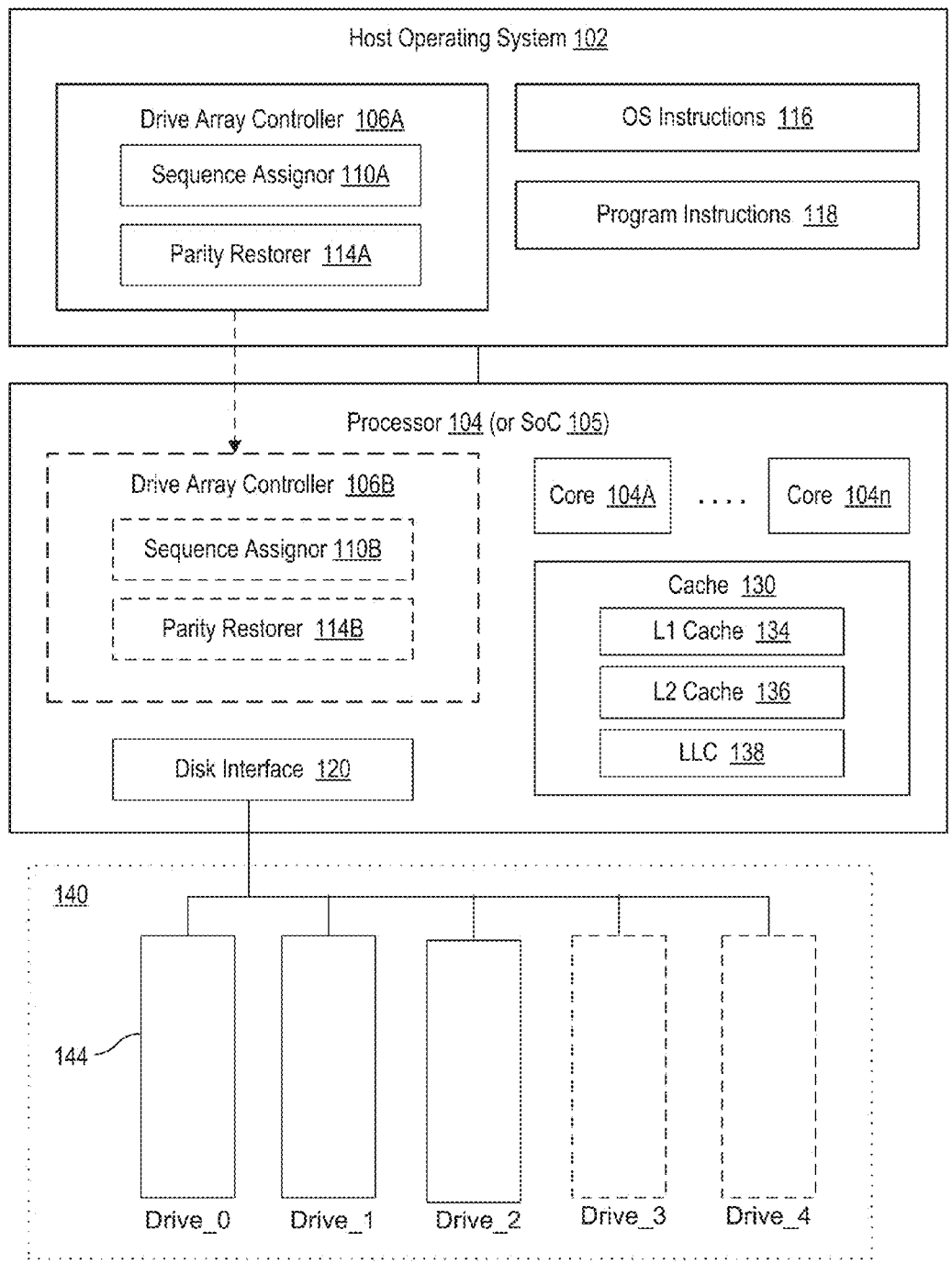
FIG. 1A is a diagram of an exemplary system and processor to control a redundant array of independent disks (RAID) according to one embodiment of the present disclosure.

One solution to a redundant array of independent disks (RAID) write hole (RWH) event is to buffer writes on non-volatile (NV) media. Hardware drive array controllers in production today provide an option to include non-volatile media, for example, a battery-backed volatile memory such as Dynamic Random Access Memory (DRAM) unit (BBU) or NV dual in-line memory module (DIMM) or other NV-memory such as three-dimensional (3D) cross-point memory, ferroelectric memory, silicon-oxide-nitride-oxide-silicon (SONOS) memory, polymer memory such as ferroelectric polymer memory, nanowire, ferroelectric transistor random access memory (FeTRAM or FeRAM), ovonic memory, nanowire, PCMS (phase change memory with switch), phase change memory, memristors, Spin Transfer Torque (STT)-magnetoresistive random access memory (MRAM) and MRAM to buffer writes and parity data. This data is used for recovery should a RAID member drive fail or in the case of power failure. This may be an expensive solution because of the additional hardware costs. Furthermore, the NV media becomes a primary performance bottleneck and endurance challenge since all host writes and parity writes are saved in this media.

Another solution includes saving an intermediate parity calculation, referred to as a partial parity log (PPL) value, to the RAID member drives when the RAID volume is degraded, e.g., a RAID drive has failed. The PPL value may be combined with metadata that defines the PPL value, and which may be used to restore parity consistency, as a PPL container, which is written to an arbitrarily chosen functioning drive. The PPL value may be calculated as an exclusive OR (XOR) of the prior data that is being overwritten and the prior parity value in the stripe (for a read-modify-write operation). A dirty stripe journal (DSJ) may also be maintained to track the active stripes. The PPL value, therefore, is used to recover the data on the failed drive, such as in the case of a power failure, as per normal RAID processing. Unfortunately, this technique only partially solves a RWH in handling drive failure followed by a power failure, because this technique does not handle the reverse order of these failures: a power failure (or drive crash) followed by a drive failure. Furthermore, the time period between these two failures has to be long enough for all in-flight requests (sent to the RAID volume before the drive has failed) to be completed because, for those requests, there are no PPL values stored.

In yet another solution, an additional drive and host logic for cross-device atomic operations may be employed. This approach utilizes custom run-time storage commands that introduce additional runtime waits. More specifically, the approach uses Open( ) and Close( ) commands surrounding all writes that are issued to each of the RAID drives, and there is a Wait required for all writes to complete across multiple RAID member drives before the Close( ) command can be issued to the RAID member drives. This may impact performance.

Embodiments of disclosed solutions may overcome the shortcomings of the above-referenced solutions. In one or more embodiments, a system (or processor or system-on-chip (SoC)) may include drive array controller logic to assign a unique sequence number to each write operation received from a computing device and convert respective write operations, including a corresponding sequence number, to a multiple-drive write of a series of drives in a RAID configuration (e.g., a RAID system). A microcontroller at each drive may then extract a sequence number from a write command and write, to a history log (HLOG) stored in volatile memory in the drive, an entry that includes a logical-to-physical (L2P) address mapping of a prior sector of the RAID drive that was written and the sequence number extracted from the write command. The prior sector written may correspond to the most recently written prior physical address for the logical address. Upon receipt of a new write command to the logical address, the microcontroller may remove an entry already present in the HLOG for the logical address, and write a new entry in the HLOG containing the prior physical address as mapped to the logical address and a new sequence number extracted from the new write command. This logging in the HLOG may continue to store the most recent write history for logical addresses with corresponding sequence numbers.

Upon detecting a power-loss-imminent (PLI) event of the RAID system, the microcontroller of each RAID drive that is still functional may write the HLOG from volatile memory of the drive to non-volatile memory (NVM) on the corresponding drive. In one embodiment, one or more capacitors are operatively coupled to the volatile memory to provide enough voltage to the volatile memory to provide sufficient time after power failure to save the HLOG to NVM. In advance of performing a drive recovery after a failed drive or a loss of power, the system may issue an HLOG retrieval command to obtain the HLOGs from all the functional drives. In one embodiment, the HLOG may be stored in fast NVM (e.g., any NVM that is faster-access memory than the NVM on the corresponding RAID drive), in the NVM of the RAID drive or on the SoC (or otherwise near the drive array controller), thus avoiding the step of writing the HLOG to drive upon detecting a PLI event.

With the HLOGs, the system (or processor or SoC) may determine whether to use prior parity data (from a recent previous write to a parity drive) or new parity data from a parity drive by comparing a sequence number in the HLOG on the parity drive for a stripe with a sequence number in the HLOG on a corresponding data drive for the stripe. In this way, parity consistency is restored across the RAID system without use of a separate disk or performing many writes to NVM throughout normal operation. To restore consistency to each data drive, the system may determine whether to use prior data or new data by comparing a sequence number in the HLOG for the data with the sequence number corresponding to parity data on the parity drive for the stripe.

There is virtually no run-time performance impact with the disclosed RWH solutions because no additional reads or writes to non-volatile memory are required during normal operation (when no RAID drive has failed and no power is lost). There are also no input-output operations, wait-sequences or locks required. That combined with the freeing up of non-volatile memory that is used in the PPL approach, makes the disclosed solutions cost effective and efficient.

FIG. 1A is a diagram of an exemplary system 100 and processor 104 to control a redundant array of independent disks (RAID), or RAID system, according to one embodiment. The system 100 may include a host operating system 102 executable by the processor 104 or by a system-on-chip (SoC) 105 that includes the processor 104. A SoC is an integrated circuit (IC) that integrates components of a computer into a single IC with a common carrier substrate. The processor 104 may also be a system in package in which a number of integrated circuits are implemented in a single package.

The system 100 may further include a RAID system 140 including a number of RAID drives 144 controlled according to any number of different RAID configurations (such as RAID 4, RAID 5, RAID 6, or RAID 50 or 60 for example). The several drives of the RAID system 140 are labeled as Drive_0, Drive_1, Drive_2 and optional Drive_3 and Drive_4 may also be put into operation, depending on implementation. The RAID drives 144 of the RAID system may be mechanical disk drives, solid state drives (SSDs), or other NVM disks in various embodiments.

The host operating system 102 may include software such as operating system instructions 116, program instructions 118 (for execution of software applications) and a drive array controller 106A, which may include an associated device driver, to control the RAID system 140. In one embodiment, the drive array controller 106A is an enhanced version of Rapid Storage Technology enterprise (RSTe) by Intel® of Santa Clara, Calif. The RSTe RAID controller configures and manages RAID logic and support, including data protection and recovery operations after a RWH event.

In one embodiment, the program instructions 118 include a user space application, or the user space application may be executed elsewhere (outside of the host operating system 102) and may cause a write command to be sent to one or more of the drives in RAID system 144. For example, as will be discussed in more detail later, the write command may be made through a networked connection such as through a remote direct memory access (RDMA) connection or other networked connection. Accordingly, write commands may originate from the operating system 102, from a user space application executed within the operating system or from external entities networked with the operating system 102 such as an RDMA device.

The processor 104 may include one or more processor cores 104A through 104n, a drive array controller 106B, a disk interface 120 and a cache 130 that includes L1 cache 132, L2 cache 136 and a last level cache (LLC) 138, for example. In one embodiment, the drive array controller 106B is implemented in hardware on the processor 104 or on the SoC 105. In another embodiment, only part of the drive array controller 106A is implemented as the drive array controller 106B, and thus the two share functionality. Accordingly, the drive array controller may be implemented in software, in hardware, or in a combination of software and hardware, by executing drive array controller logic (or drive array logic) either as instructions by an application installed on the operating system 102 and/or as firmware or other hardware logic instantiated as the drive array controller 106B. The processor 104 or the SoC 105 may further include a disk interface 120 to provide a communication port and other connection capability between the drive array controller 106B (and possibly the drive array controller 106A) and the RAID system 140.

In another embodiment, the drive array controller 106B may be located on an IC chip that is separate from the processor 104 and the SoC 105. The processor 104 may be located on, for example, one end of a Peripheral Component Interconnect express (PCIe) bus and the drive array controller chip may be located on the other end, as would be apparent to one of ordinary skill in the art.

The drive array controller 106A may include a sequence assignor 110A and a parity restorer 114A. Likewise, the drive array controller 106B may include a sequence assignor 110B and a parity restorer 114B. The sequence assignor 110A or 110B may assign a unique sequence number to respective ones of the plurality of write operations as each write operation is received from the host operating system 102. The sequence numbers may be increased monotonically over time as the sequence numbers are assigned to respective write operations, so that recently assigned sequence numbers are distinguishable from each other. Accordingly, the sequence numbers may be viewed as a kind of time stamp in that, as time increases, the sequence number may increase as well.

The drive array controller 106A or 106B may then convert respective ones of the plurality of write operations, including corresponding sequence numbers, to a multiple-drive write command (or write) of the RAID system 140. Such a multi-drive write command generates multiple write commands, one each to data drive(s) for a stripe targeted by the multi-drive write command (to write the data to one or more strips of the stripe), and another to a parity drive for the stripe to which to record parity that may be used to recover the data if a data drive fails.

The pseudocode of FIG. 3 shows how this works for logical block addressing (LBA) of a write operation containing a logical address (L) and data (D), in a three-drive RAID 5 configuration, where the host operating system 102 targets a strip to Disk_1 (e.g., Drive_1) that includes a corresponding stripe parity to be written to Disk_3 (e.g., Drive_3). The drive array controller may calculate a new parity ($P_{new}$) and generate a new sequence number for the write operation (G_SEQ++). The multi-drive command may then be created, for example, as a data write to Disk_1 of (L, D, G_Seq) and a parity write to Disk_3 of (L, P, G_Seq), where the same sequence number is used in both write commands. Inserting the sequence number into the write commands in this way requires no additional input-output operations or waits, so is efficient and cost-effective.

Each RAID drive 144 of the RAID system 140 may extract the sequence numbers from incoming write commands and write the sequence numbers to a local history log (HLOG) in association with a logical-to-physical (L2P) address mapping of each write to that RAID drive, whether the write command is for data or parity, to track the most recently written physical addresses in association with corresponding sequence numbers. After recovery from a power loss and/or failed drive, the drive array controller may retrieve the HLOGs from the functioning RAID drives. With the sequence numbers in these HLOGs, the parity restorer 114A or 114B may determine whether prior parity or new parity data should be used in restoring parity consistency to one or more active stripes of the RAID system 140, and what data on active stripes for functioning RAID drives to retain or to restore.

Figure 1B:
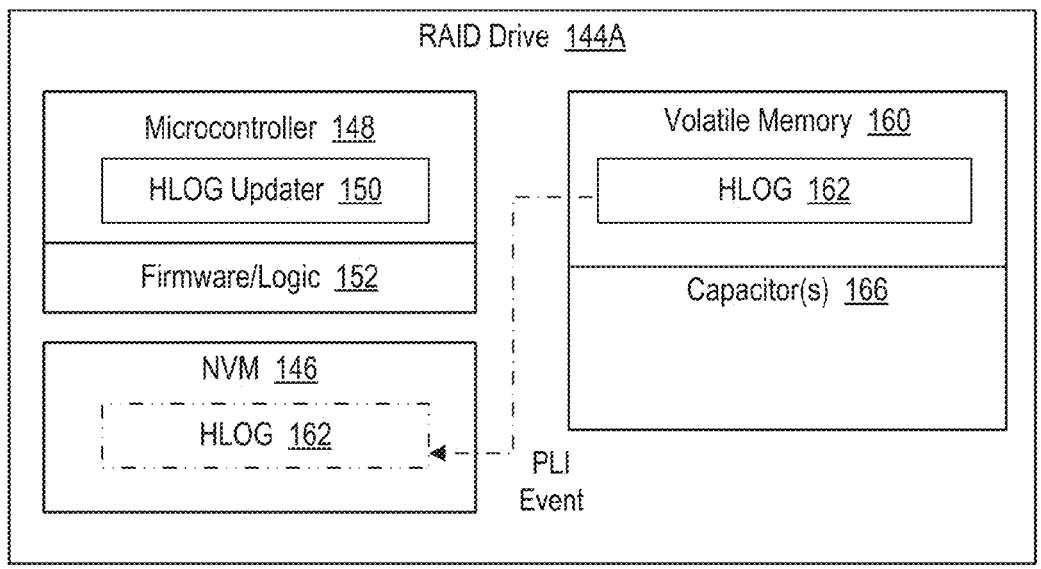
FIG. 1B is a diagram of an exemplary RAID drive of the system of FIG. 1A according to one embodiment.

FIG. 1B is a diagram of an exemplary RAID drive 144A of the system 100 of FIG. 1A. In one embodiment, the RAID drive 144A may include non-volatile memory (NVM) 146 for data storage, a microcontroller 148 containing an HLOG updater 150, firmware 152 or hardware logic executable by the microcontroller 148, and volatile memory 160 situated near the microcontroller 148. In the embodiment of FIG. 1B, the RAID drive 144A includes one or more capacitor(s) 166 operatively coupled to the volatile memory 160.

The microcontroller 148 may execute the firmware 152 (or hardware logic) to read a write command received from a drive array controller 106A or 106B (whether to write data or parity from a logical address or a physical address) that was created as part of a multi-drive write command after receipt of a write operation from the operating system 102. The microcontroller 148 may, by way of the HLOG updater 150, further extract a sequence number from the write command that corresponds to the write operation received from an operating system. The HLOG updater 150 may then write, to a history log (HLOG) 162 stored in the volatile memory 160, an entry that includes a logical-to-physical (L2P) address mapping of a recently written sector of the NVM and the sequence number extracted from the write command. In other words, each HLOG entry may include: (i) a L2P mapping between a logical address of the write command and a prior physical address written to the NVM 146 for the logical address; and (ii) the sequence number extracted from the write command. Because the sequence numbers are monotonically increasing while being assigned, each unique sequence number associated with a multi-drive write command indicates a write order and therefore provides a temporal tracking capability to the drive array controller, which may retrieve the HLOGs from operational drives in the case of a read-write-hole (RWH) event.

In one embodiment, the HLOG 162 may be implemented as a circular or first-in-first-out buffer, which may also be associated with a hash table (or other software data structure like lookup table) to facilitate searches for physical addresses within the HLOG. The HLOG updater 150 and/or the drive array controller 106A and 106B may use the logical address (LBA) as a key or word to quickly find a corresponding physical address on the RAID drive 144 by way of a search algorithm (such as a hash-table or other similar software search data structure mechanism). Implementing the HLOG as a circular buffer and being physical-address-search capable may help to accelerate defragmentation checks, which will be discussed with reference to FIG. 5.

Because common volatile memory, such as dynamic RAM (DRAM), instantly loses any data stored in the volatile memory upon losing power, there is a risk of losing the HLOG 162 when the RAID drive 144A loses power (whether through a reboot or a power failure). In one embodiment, the capacitor(s) 166 may store enough charge to provide sufficient voltage to the volatile memory such that, in response to detecting a power-loss-imminent (PLI) event in the drive 144A, the microcontroller 148 has enough time to retrieve the HLOG 162 stored in the volatile memory 160. The firmware 152 may contain PLI logic to be executed in the case of detecting an imminent power loss, e.g., a PLI event. In the present embodiment, the PLI logic may be updated such that the microcontroller 148, in response to detecting a PLI event, retrieves the HLOG 162 from the volatile memory 160 and stores the HLOG 162 in the NVM of the RAID drive 144A. In another embodiment when the volatile memory 160 is instead persistent memory or other type of fast NVM (discussed below), this step is not needed and the HLOG stored in the NVM can be read from the NVM after power loss assuming the RAID drive 144A is operational.

Figure 1C:
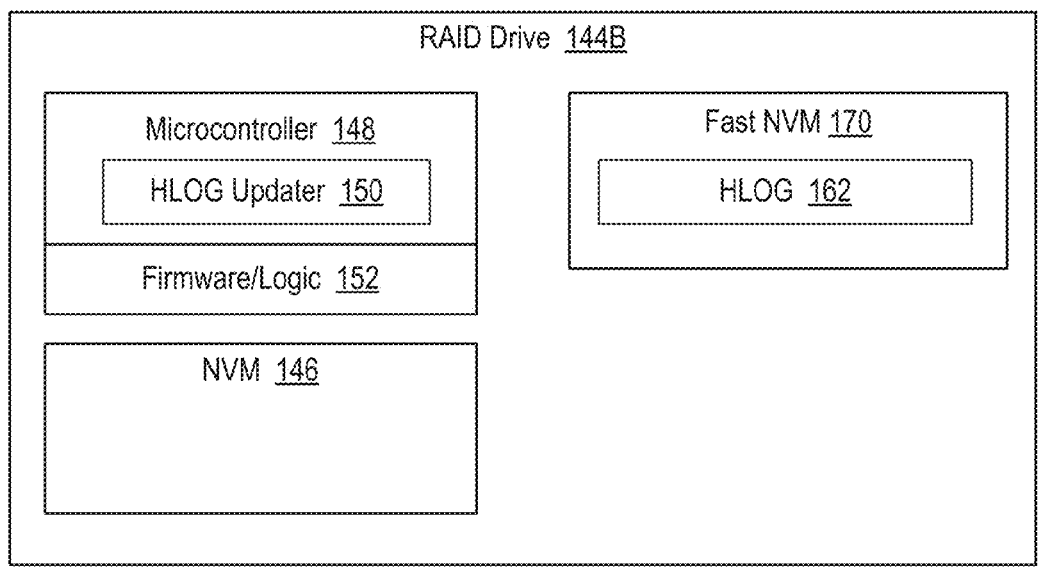
FIG. 1C is a diagram of an exemplary RAID drive of the system of FIG. 1A according to other embodiments.

FIG. 1C is a diagram of an exemplary RAID drive 144B of the system 100 of FIG. 1A according to other embodiments in which, instead of volatile memory, the RAID drive 144B includes separate, fast NVM 170 in which to store the HLOG 162. The fast NVM 170 is secondary non-volatile memory that is faster than the primary NVM 146 and supports in-place writes. For example, the fast NVM 170 may be a bit-addressable (e.g., direct addressable) write-in-place persistent memory, racetrack or domain-wall memory (DWM), or other such memory that is faster than NAND-based memory. The persistent memory described herein may be 3D cross-point memory, ferroelectric memory, silicon-oxide-nitride-oxide-silicon (SONOS) memory, polymer memory such as ferroelectric polymer memory, nanowire, ferroelectric transistor random access memory (FeTRAM or FeRAM), ovonic memory, nanowire, PCMS (phase change memory with switch), phase change memory, memristors, Spin Transfer Torque (STT)-magnetoresistive random access memory (MRAM) and MRAM. In these other embodiments, the capacitor and the updated PLI logic are unnecessary because the most recently written HLOG in each RAID drive 144 will be available in the fast NVM 170 regardless of loss of power. In one embodiment, the fast NVM 170 may be a pre-allocated section of the NVM 146 if access speed to the NVM 146 within the RAID drive 144 is sufficient to maintain the HLOG updated with most recent write commands.

After recovering from a power loss, the drive array controller 106A or 106B may send an HLOG retrieval command to retrieve the HLOGs from operational RAID drives. The drive array controller may then use the sequence numbers within the HLOGs to help restore parity consistency to any stripes that need it, in advance of performing a drive recovery on any failed drive, and to determine which data (whether prior or newly written data) to retain on data drives of the RAID system 140.

Figure 1D:
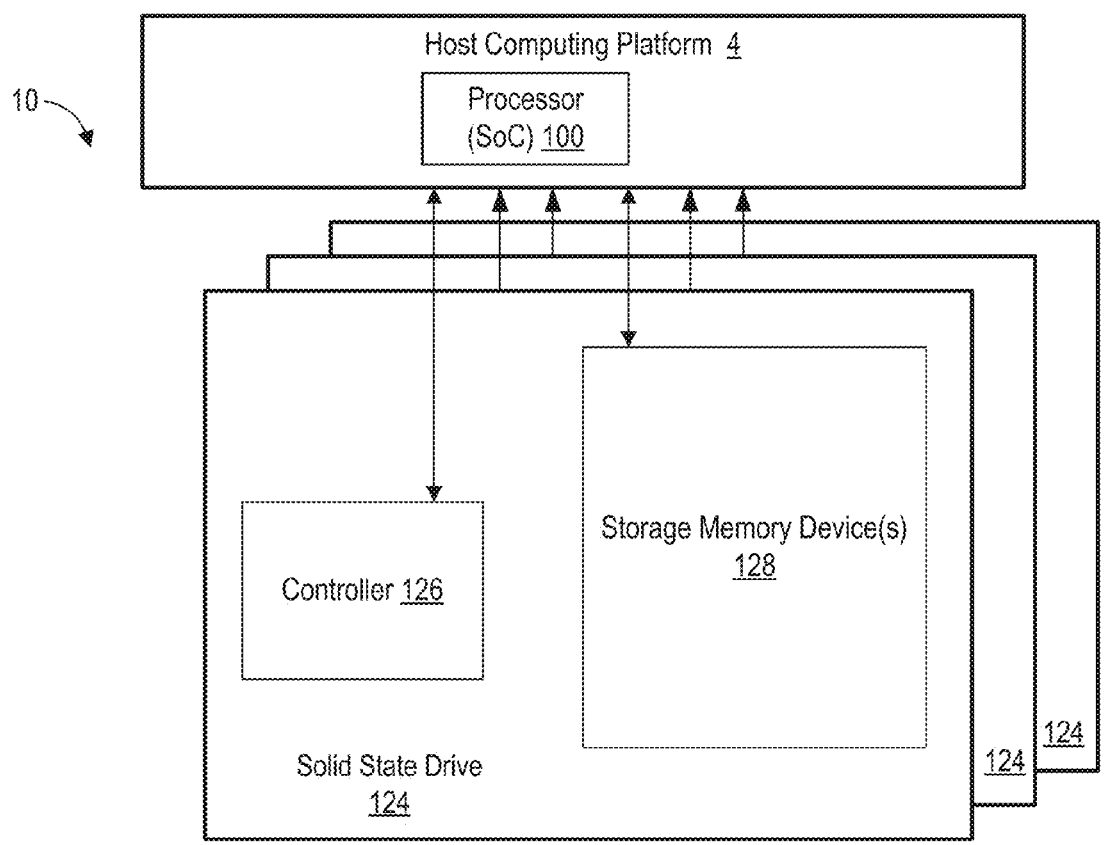
FIG. 1D is a block diagram of an exemplary computer system including an exemplary solid state drive useable in a RAID system in the disclosed embodiments.

FIG. 1D is a block diagram of an exemplary computer system 10 including solid state drives (SSDs) 124 useable in the RAID system 140 of FIG. 1A. The SSDs 124 may be the drives 144 in FIG. 1A. The computer system 10 may include a host computing platform 4 with the processor (or SoC) 100. The host computing platform 4 is communicably coupled to the SSDs 124 using an input/output (I/O) interface. For example, the SSDs 124 may each include a Serial Advanced Technology Attachment (SATA) connector on the respective SSD 124 that connects to physical interconnects of the host computing platform 4. As noted above, the I/O interface may be arranged as a SATA interface to couple elements of the host computing platform 4 to one or more of the SSDs 124. In another example, the I/O interface may be arranged as a Serial Attached SCSI (SAS) interface to couple elements of the host computing platform 4 to one or more SSDs 124. In another example, the I/O interface may be arranged as a Peripheral Component Interconnect Express (PCIe) interface to couple elements of the host computing platform 4 to one or more SSDs 124. In another example, the I/O interface may be arranged using Non-Volatile Memory (NVM) Express (NVMe) protocol over PCIe to couple elements of the host computing platform 4 to one or more SSDs 124.

The respective SSD 124 may also include, but not be limited to, a controller 126 and storage memory devices 128. The controller 126 (also referred to as a SSD controller) may receive commands issued by the host computing platform 4 for writing/reading information to/from the storage memory devices 128.

In some examples, the storage memory device(s) 128 may include one or more chips or dies that may individually include one or more types of non-volatile memory (NVM) including, but not limited to, NAND flash memory, NOR flash memory, three dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory, nanowire, PCMS (phase change memory with switch), phase change memory, memristors, Spin Transfer Torque (STT)-magnetoresistive random access memory (MRAM), MRAM or any other suitable non-volatile memory. For these examples, the drives 144 of FIG. 1A may be arranged or configured as solid-state drives (SSDs) as depicted in FIG. 1D. Examples are not limited to drives arranged or configured as SSDs, as other storage devices such as a hard disk drive (HDD) are contemplated.

With further reference to FIG. 2, the HLOG 162 may be maintained as a table having entries written according to sequence number. The right two columns may include the logical address for new data and the old (or prior) physical address on the NVM 146 of the RAID drive 144A or 144B to which the logical address maps. On a given RAID drive, the sequence numbers need not be consecutive as a particular RAID drive may not participate in a write for a while, while other member drives may process host writes.

FIG. 4 is example pseudocode for updating the HLOG 162 on a RAID drive upon receipt of a RAID 5 write such as that of FIG. 3. In one embodiment, existing copy-on-write and indirection management algorithms for a RAID drive may be extended to update the HLOG on each incoming write (or at least most writes). Current algorithms update a logical-to-physical (L2P) table with a mapping between a logical address and a current physical address where data for that logical address is stored. With the embodiments of the present disclosure, an HLOG entry may also be written to the HLOG with each incoming write command. The HLOG entry, as discussed, may include the L2P mapping between the logical address and the most recent prior physical address for that logical address, in association with the sequence number extracted from a new write command: HLOG.add(Seq, L, L2P[L]). When an HLOG entry already exists for the logical address, the HLOG entry that is present may first be removed: HLOG.removeIfPresent(L).

To provide an example of how the pseudocode of FIG. 4 works, assume a RAID drive 144 receives an incoming write to logical address 80 with data A1 and sequence number 5, e.g., (L=80, Data A1, Seq. 5). Assume also that the physical address being written on the NVM 146 is 2048. If we also assume this is the first write to logical address 80, then the HLOG entry according to the pseudocode of FIG. 4 will be (Seq. 5, 80, _), where the "prior physical address" entry is blank because there is none. Now assume that a second write command comes into the same RAID drive 144 to logical address 80 with data A2 and sequence number 71, e.g., (L=80, Data A2, Seq. 71). The new HLOG entry according to the pseudocode is now (Seq. 71, 80, 2048) because the prior physical address was 2048. If we assume that the new physical address is 7432 for the new write, a L2P table for current writes may be updated to map logical address 80 to physical address 7432. This new physical address may then become the prior physical address in the next HLOG entry should a third write command to logical address 80 come into the RAID drive 144.

The HLOG 162 is sized to be big enough to be able to restore the last active write to a stripe that may be in progress across the drives of the RAID system 140. The HLOG 162, however, may still be kept relatively small to only store mappings to logical addresses for the most recent writes that may be used to roll back certain write operations in the case of a RWH event. The size of the HLOG 162 may be further reduced by adding a specific commit command, e.g., Commit(seq), that the drive array controller 106A or 106B may send to the RAID system 140 to have the drives 144 discard all HLOG entries below a specified sequence number. The more entries there are below that sequence number, the more space may be freed up from tracking the HLOG entries in the volatile memory 160 and the capacitor 166 (for RAID drive 144A) or within the fast NVM 170 (for RAID drive 144B) and/or in the NVM 146 of each respective RAID drive. The firmware 152 of each RAID drive may also be updated so that, when the commit command is used, the firmware of each RAID drive 144 executes a pause on write-completion when the HLOG 162 is full, to ensure a write is updated in the HLOG before erasing the HLOG entries that have a sequence number below the specified number.

FIG. 5 is example pseudocode for defragmenting a RAID drive using HLOG entries according to one embodiment of the present disclosure. The normal defragmentation algorithm, executed by each microcontroller 148, considers data at a physical address stale when the L2P table does not include a pointer to it, and thus is data that can be deleted. Embodiments of the present disclosure extend the defragmentation algorithm to consider data stale when there is no L2P entry pointing to it and there is no HLOG entry pointing to the data. The defragmentation algorithm may further be enhanced by tracking any relocation of such data in the HLOG as shown in the pseudocode of FIG. 5.

More specifically, the defragmentation algorithm may be extended to ensure that physical locations (even prior copies) of recently written data are not erased. This may be executed by a DefragPage algorithm that moves the data to which the HLOG points to a safe location, prior to the location being erased by a DefragBlock algorithm. The "else" section of the pseudocode in FIG. 5 performs this relocation of the data from a current physical address (P) to a new physical address (P2). A safe location for the DefragPage algorithm may be an area of the NVM that only the firmware running on the drive 144 can access and use for actions like extending the DefragPage algorithm, among other actions. So, for example, a RAID drive may be 256 GB but only 246 GB are accessible by the host operating system 102, and the last 10 GB may be used by firmware for specific purposes such as defragmentation.

FIGS. 6A and 6B include example pseudocode of read-write-hole (RWH) recovery for a RAID 4-controlled or a RAID 5-controlled array using HLOGs stored on respective drives of the RAID system 140. This pseudocode details a recovery algorithm that may scan through active stripes, and decide which data (prior data or new data) to use from each RAID drive 144, depending on the latest completed sequenced write per drive. The algorithm may use this information to update the stripe to have consistent parity (thus closing the RWH), which is then used to recover the data on a failed drive. In short, the drive array controller 106A or 106B may scan through all active stripes, and determine (in lines 2(iii-iv) of the pseudocode) what parity information to use (prior or new), and determine (in line 2(v) of the pseudocode) what data information to use (prior or new) from each drive. This decision may be based on sequence numbers from the HLOGs to ensure consistency.

At the top of the pseudocode in FIG. 6A are a number of definitions for structures and variables referenced within the pseudocode. Starting with section two (2), what follows is a detailed explanation of the various lines and sections of the pseudocode, which explain reconstructing a stripe state reliably for all stripes that were recently active (being written) prior to power-failure. For purposes of explanation, the pseudocode refers to a single stripe (L) being recovered and a current RAID drive (J) being recovered.

At line two (2), for each stripe L in a list of active stripes (Q), the individual RAID drives keep a record of writes issued internally to the RAID system 140 (such as SSD media) of each operational RAID drive through their respective HLOGs 162. Data in each RAID drive is a portion of a larger piece of data called a stripe or data stripe (L in the algorithm), that goes across all RAID drives in a RAID configuration. The drive array controller 106A or 106B may retrieve the HLOGs on the respective RAID drives 144 of the RAID system 140 in order to execute the recovery from a RWH.

In line 2(a), reference to a parity drive recognizes that in a RAID configuration for any given stripe, one of the strips on one of the member drives 144 is the parity drive where parity is stored for that stripe. In RAID 4, the parity drive is always the same drive (e.g., Drive_3). In RAID 5, by contrast, the parity drive rotates per stripe to different strips, which means that the parity drive is rotated across the RAID drives 144 for corresponding stripes depending on where the parity is written for any given stripe. The parity (or parity data) written is normally the XOR of the other portions of a stripe stored on the data drives. This parity may be used for data recovery when one of the drives fails or becomes corrupted. In RAID 6, there are two parity drives to which different data drives rotate writing parity data, per stripe, similar to RAID 5. For RAID 6, the second parity may be another XOR but does not have to be. For example, the second parity may be a linear-feedback shift register version of an XOR calculation. Accordingly, section 2(a) is addressing recovering data from a drive that is not the parity drive.

In line 2(a)(i), the drive array controller may retrieve the sequence number ($SEQ_p$) of the RAID drive containing the parity data of data stripe L from the HLOGs 162 retrieved from the RAID system 140.

In line 2(a)(ii)(1), for the data stripe (L), the drive array controller retrieves the sequence numbers found on all the other RAID drives that is not the parity drive, e.g., the data drives that contain actual data.

In line 2(a)(iii), the RAID system controller is considering a drive that is not a parity drive of data stripe L (e.g., it is a data drive) as well as avoiding the case of comparing the data drive to itself.

Further in line 2(a)(iii), a constraint is met when the parity sequence number is found for that data stripe (L) in the HLOGs and the parity sequence number is greater than all the data drive sequence numbers that are found in the HLOGs (and all of the sequence numbers of the data drives are found) for data stripe L.

If line 2(a)(iii), then at line 2(a)(iii)(1), the drive array controller may retrieve the prior parity data. As discussed, the prior data location may be stored in the HLOG which the drive array controller can retrieve using a special command (NVM Express (NVMe) vendor command, for example, or some other similar type of drive command). The L2P table may include a pointer to the new, up-to-date data on a completed write of date to the RAID drive, which can be retrieved with a read to the drive. What this means is the parity was generated and written to the parity drive before an unexpected failure and all the other data was written to the respective data drives. Thus, the drive array controller does not use the latest parity for data drive reconstruction, but the last, previous, good parity data.

In the embodiment that the drive array controller retrieves the HLOG with a NVMe vendor command, the disk drives of the RAID system may be coupled to a Peripheral Component Interconnect Express (PCIe) interface and accessed via NVMe with a NVMe controller. NVM Express (NVMe) is a scalable host controller interface designed to work with storage systems that utilize PCIe disk drives, and particularly SSDs that demand faster access speeds. The NVMe interface provides an optimized command issue and completion path, which includes capability for parallel operation by supporting up to 64K commands within a single input/output (I/O) queue to a device. The NVMe interface operates through a paired submission and completion queue mechanism. Commands are placed by host software into a submission queue where each processor core may have one or more submission queue. Completions are placed into an associated completion queue by the NVMe controller. Multiple submission queues may utilize the same completion queue, where the submission queues and the completion queues are allocated in host memory. The information necessary to complete a 4 KB read request is included in a 64 byte command, ensuring efficient small random I/O operation. The NVMe controller, accordingly, may issue an NVMe vendor read command (or other similar type of drive command) to read the HLOG after recovery from a PLI event, in order to perform the disk drive recovery explained herein.

In line 2(a)(iv), if not as in line 2(a)(iii)(1), then there is a data drive sequence number greater than the parity drive sequence number for the stripe (L). Thus, the drive array controller selects the latest data on the parity drive to which the respective address pointer in the L2P table points. This means the data from the data drive is rolled back to the last known successful write (in a future step), or in other words its prior data, which has the same or smaller sequence number value as that of the parity drive's data.

In line 2(a)(v), for the current data stripe the drive array controller analyzes L, and for each drive that is not the parity drive, the next steps are performed. In line 2(a)(v)(1), where the data drive has not been written to in a really long time or the parity drive has been written to fairly recently, and the sequence number for the data on this data drive is less than or equal to the sequence number for the parity on the parity drive for this given data stripe (L), then do line 2(a)(v)(1)(a), else do line 2(a)(v)(2)(a).

At line 2(a)(v)(1)(a), the drive array controller may retrieve the current (and latest) data from this data drive. This is read to this data drive. At line 2(a)(v)(2)(a), a data portion of data stripe L was written to the data drive before the parity data was written to the parity drive when the unexpected shutdown occurred (e.g., a RWH). Thus, the drive array controller may roll back and retrieve the last good portion of data for the drive, the prior data, to which the HLOG points. The drive array controller may issue a command to retrieve this value from the HLOG. The "ReadOld (LBA, L)" command at the bottom of FIG. 6B is the "ReadOldData(L)" function referenced in line 2(a)(v)(2)(a).

The above algorithm in lines 2(a)(i) through 2(a)(v) may be run for each stripe needing to be made consistent because the stripe was active when power was lost and a RAID drive failed (RWH event). Once parity and data consistency have been restored with last known good values written to the active stripes of the remaining drives, data recovery of the failed drive may be performed as per lines 2(a)(vi) and 2(a)(vii).

At line 2(b) (FIG. 6B), in the case of a parity drive failure (drive J is the parity drive), the drive array controller may recreate the parity data on the parity drive of the active stripe because the data on the data drives is available. This may be performed as an XOR of all the data pieces on the operational data drives to generate the missing parity, which may then be written to the strip on a drive storing the parity data (RAID 5, for example) or to the parity drive that has been newly inserted (RAID 4, for example). In RAID 6, the parity may be either the simple XOR or a different-type XOR such as a linear-feedback shift register version of an XOR calculation, for example. In either case, a parity calculation is performed to restore parity lost from a parity drive.

The "GetStateSeq (LBA, L)" command sequence in FIG. 6B is a function that may return the sequence number of a Logical Block Address (LBA) found in the HLOG. If the LBA is not found in the HLOG, then the command sequence returns "NONE."

FIG. 7A is a flowchart of an exemplary method for the drive array controller 106A or 106B to issue write commands with sequence numbers. In one embodiment, the drive array controller may receive a plurality of write operations from an operating system of a computing device, wherein each write operation targets a stripe on a series of drives in a redundant array of independent disks (RAID) configuration (702). The drive array controller may assign a sequence number to respective ones of the plurality of write operations (706) and convert respective ones of the plurality of write operations, including corresponding sequence numbers, to a multiple-drive write of the series of drives (710).

FIG. 7B is a flowchart of an exemplary method for using the sequence numbers issued in the method of FIG. 7A to update an HLOG on respective RAID drives. In one or more embodiments, a microcontroller 148 may execute firmware on a RAID drive 144 to extract a sequence number from a write command received from a drive array controller (720). The sequence number may correspond to a write operation received from an operating system to be written to a series of RAID drives, and may be assigned monotonically increasing over time to subsequent write commands. The microcontroller may write, to a history log (HLOG) stored in the volatile memory, an entry that includes: (i) a logical-to-physical (L2P) address mapping between a logical address of the write command and a prior physical address written to the NVM for the logical address; and (ii) the sequence number extracted from the write command (730).

The method of FIG. 7B may continue in which the microcontroller receives a new write command (740). The microcontroller may determine whether there exists an entry in the HLOG for the logical address (750). An entry for a certain logical or physical address may be deleted (e.g., drop out of the FIFO buffer of the HLOG) with sufficient passage of time with no new write to the logical or physical address, or may never be used depending on allocation of LBA address space by the processor 104 or SoC 105. When there is no entry, the microcontroller writes an entry in the HLOG with the logical address and sequence number extracted from the new write command, but there is no record of a prior physical address, which is left blank in the entry. When there is an entry, the microcontroller may remove the entry in the HLOG for the logical address (770) and write a new entry in the HLOG with the logical address mapped to the prior physical address (e.g., from a L2P table) and the new sequence number extracted from the new write command (780).

Figure 8:
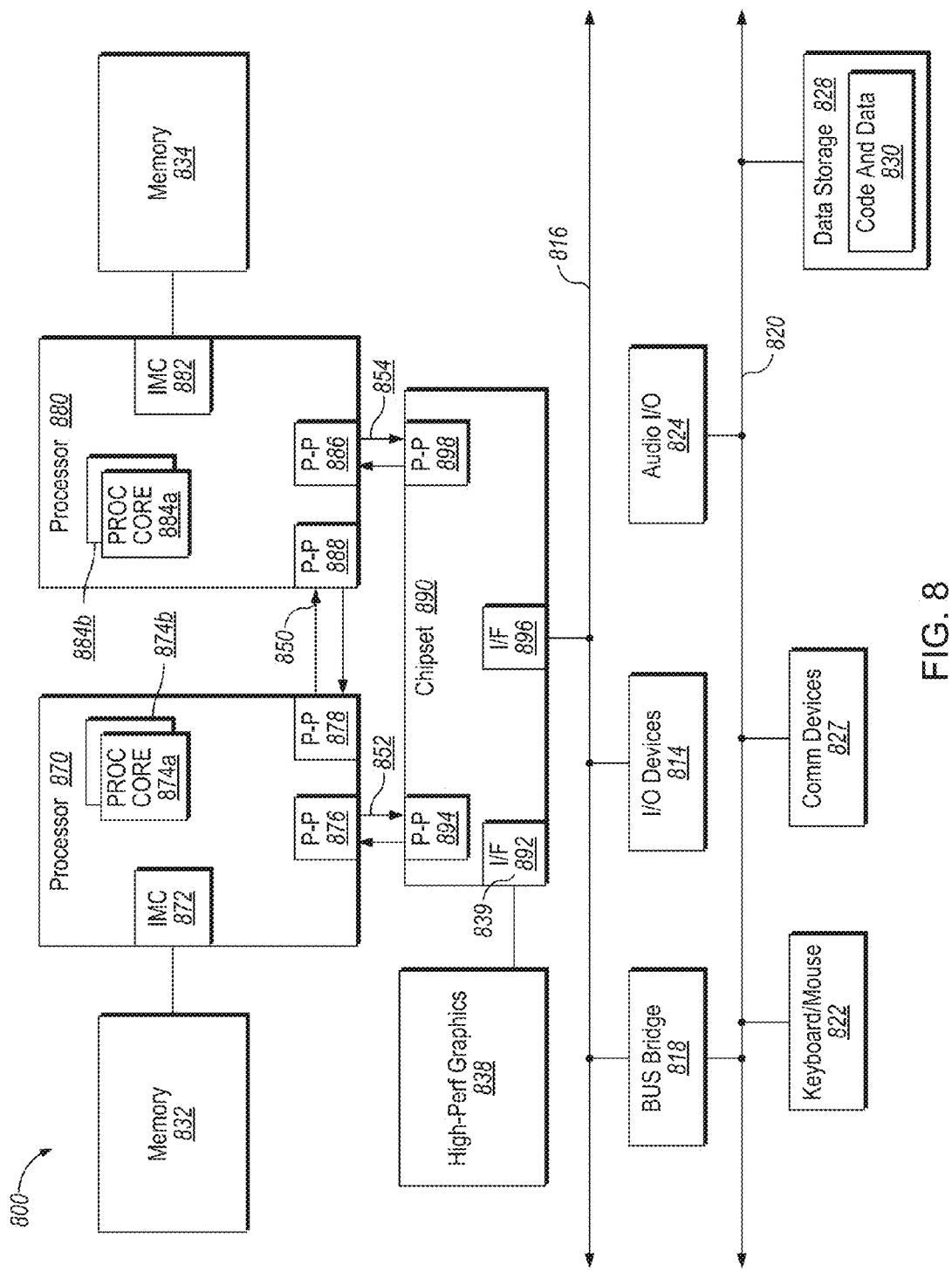
FIG. 8 is a block diagram of a computer system according to one implementation.

FIG. 8 is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the page additions and content copying can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (PtP) interfaces 876 and 888; similarly, second processor 880 includes P-P interfaces 886 and 888. Processors 870, 880 may exchange information via a point-to-point (PtP) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive, RAID solution, or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

The communications devices 827 may further include the drive array controller 106A and/or 106B with a RAID system of drives, e.g., as a networked RAID device. The networked RAID device may be an Ethernet device, a Remote Direct Memory Access (RMDA) device, or a Fibre Channel device communicating over a network of compatible technology. The RAID device may be connected by an Ethernet cable or connected wirelessly, and obtain read and write commands through a network via an assigned network address, for example. The networked RAID device, furthermore, may communicate via Internet Protocol Version 4 (IPv4) or 5 (IPv5), InfiniBand® (IB), Omni-Path™ or other communication protocol that includes storage management capability.

Figure 9:
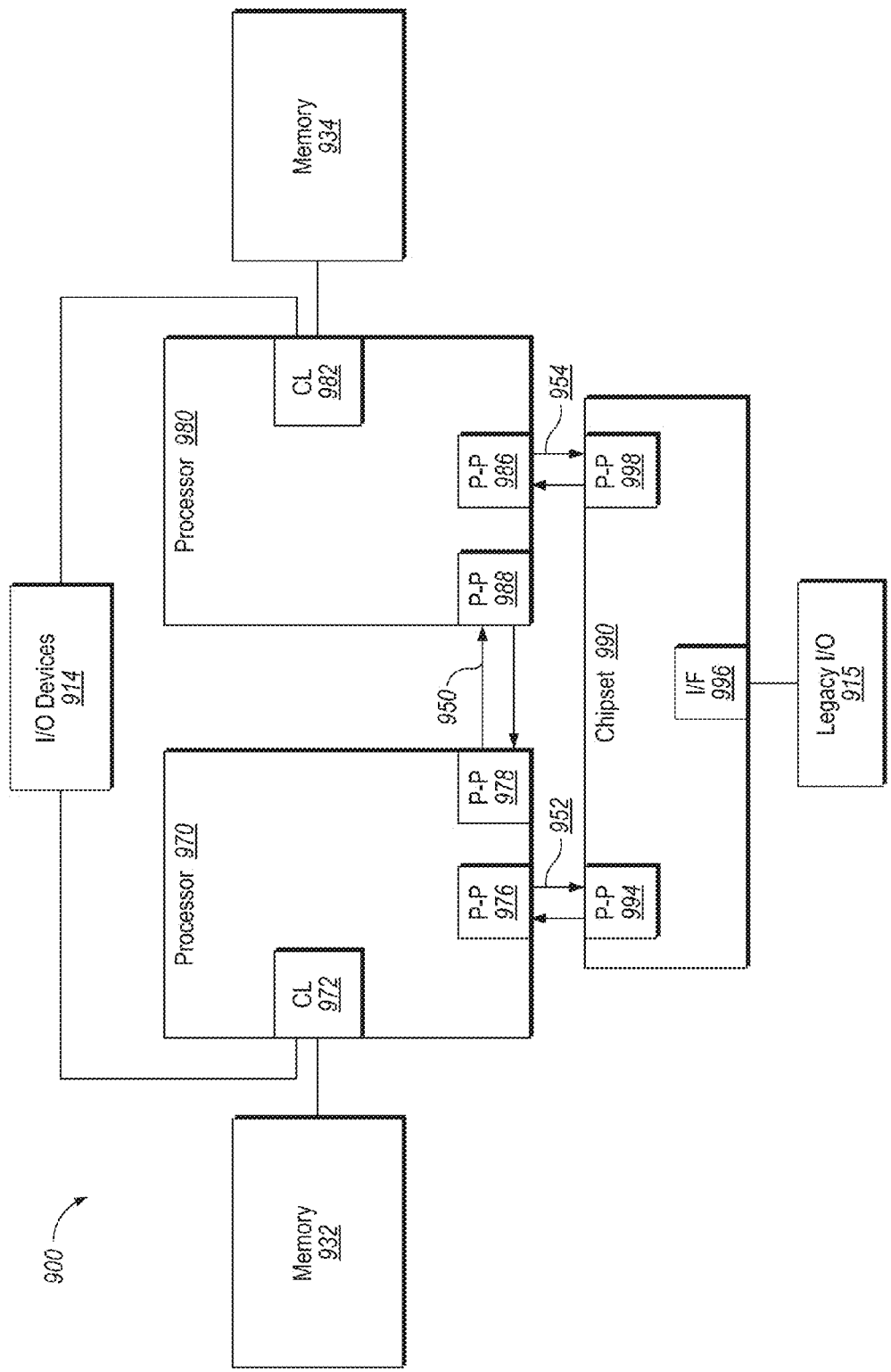
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980, which may include (or direct) a drive array controller 106A or 106B, or be a RAID device, and may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990. The embodiments of the page additions and content copying can be implemented in processor 970, processor 980, or both. Note that the lines connecting the CL 972 and the I/O devices 914, or a line directly between the CL 972 and CL 992, may be any type of bus connection, from PCIe to a network bus connection implemented under any number of network protocols, such as Ethernet, InfiniBand®, Fibre Channel, IPv4, IPv5 or the like.

Figure 10:
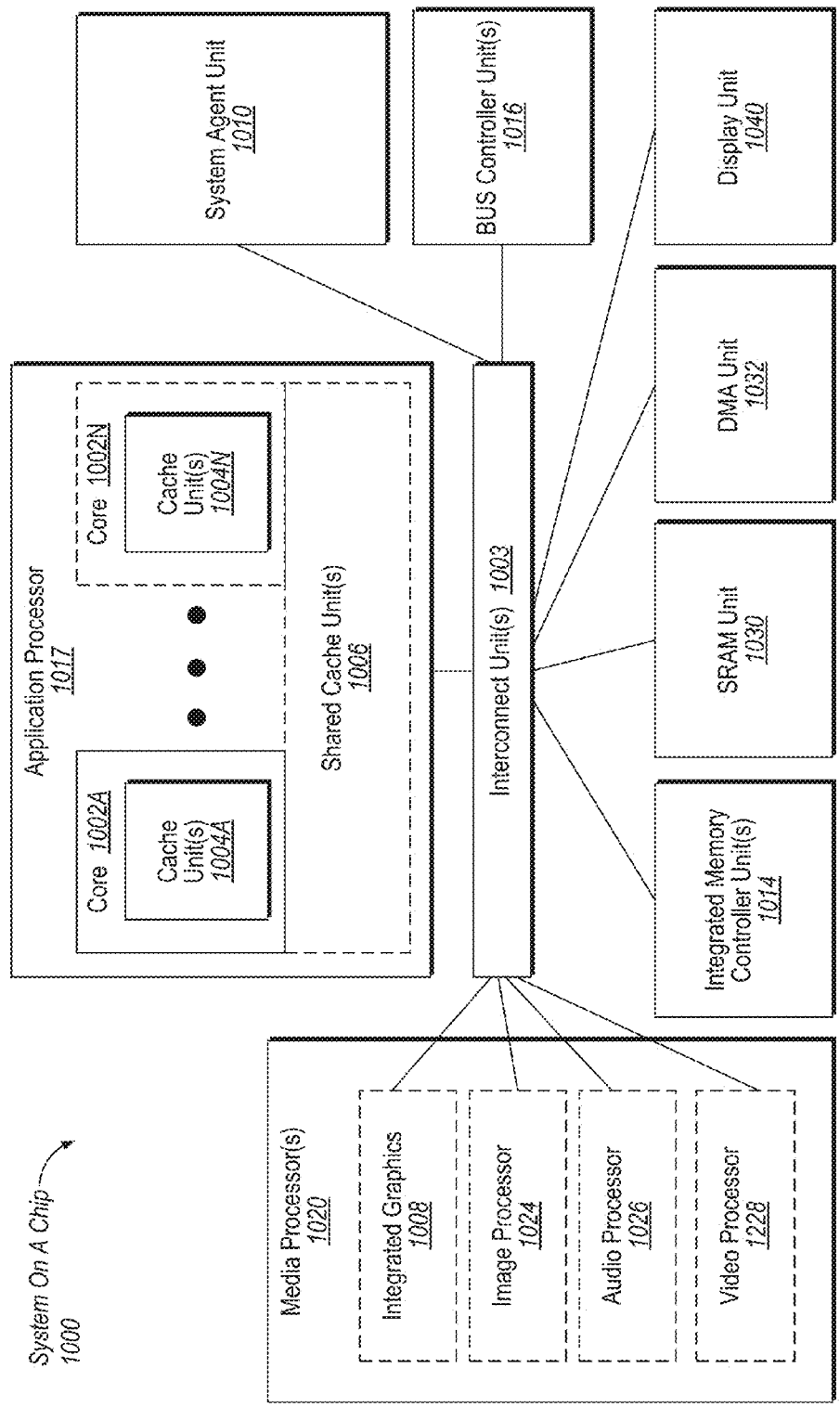
FIG. 10 is a block diagram of a system-on-a-chip according to one implementation.

FIG. 10 is an exemplary system on a chip (SoC) 1000 that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 10 is a block diagram of a SoC 1000 in accordance with an embodiment of the present disclosure. Dashed lined boxes are features on more advanced SoCs. In FIG. 10 an interconnect unit(s) 1003 is coupled to: an application processor 1017 which includes a set of one or more cores 1002A-N and shared cache unit(s) 1006; a system agent unit 1010; a bus controller unit(s) 1016; an integrated memory controller unit(s) 1014, which could include the drive array controller 106A or 106B; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
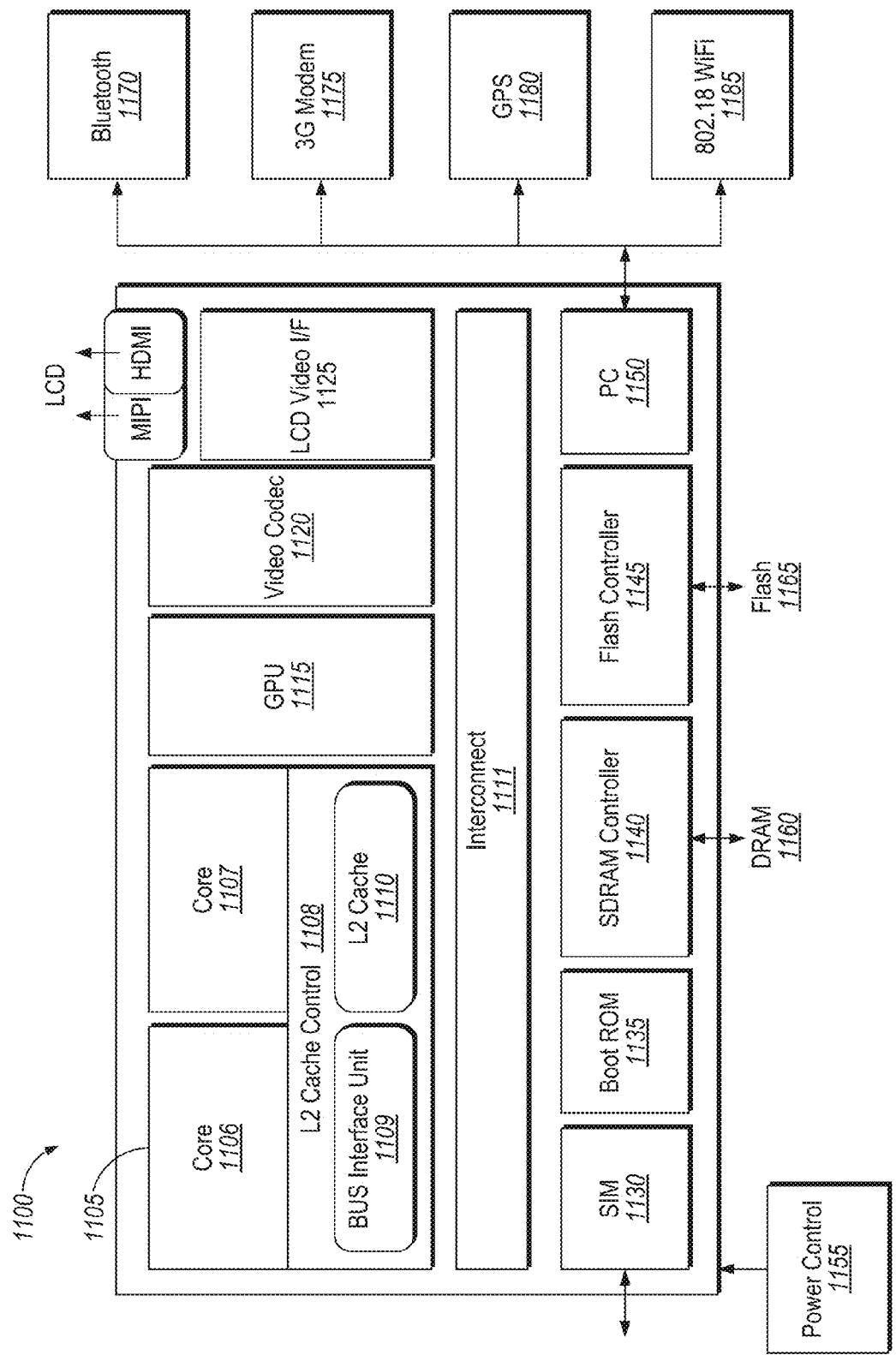
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of SOC 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
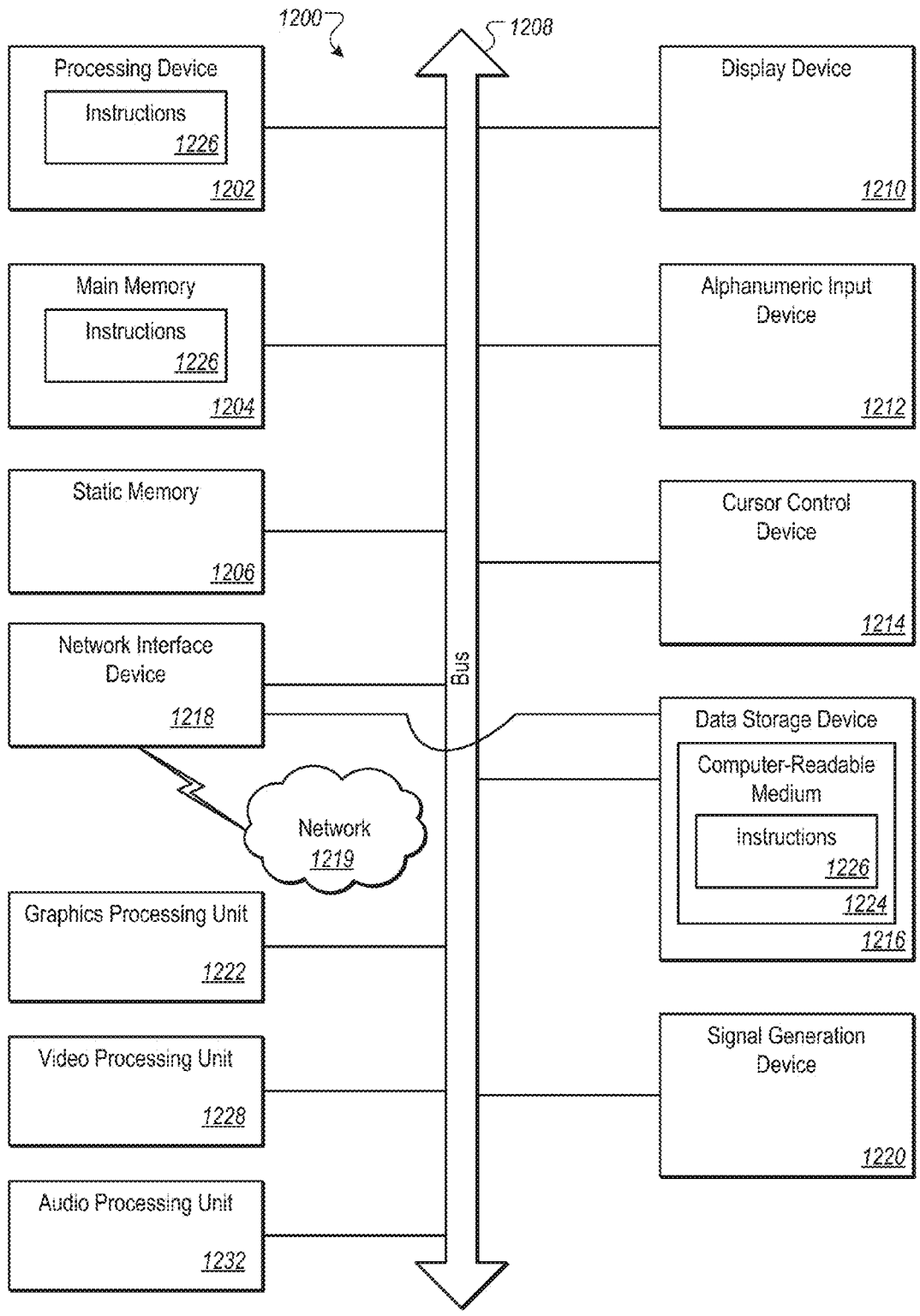
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the system 100 or processor 104 of FIG. 1 may be implemented in the computing system 1200. For example, the computing system 1200 may be a drive array controller 106A or 106B or a networked RAID device that includes the drive array controller 106A or 106B and the RAID system 140.

The computing system 1200 includes a processing device 1202, main memory 1204 (e.g., flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208. In one embodiment, the data storage device 1216 may be a networked RAID device connected to or through the network interface device 1218, such as discussed earlier.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores. The processing device 1202 is configured to execute the processing logic or instructions 1226 for performing the operations discussed herein.

In one embodiment, processing device 1202 may be the system 100 or processor 104 of FIG. 1. Alternatively, the computing system 1200 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1218 communicably coupled to a network 1219. The computing system 1200 also may include a video display device 1210 (e.g., a liquid crystal display (LCD) or a cathode ray tube (CRT)), an alphanumeric input device 1212 (e.g., a keyboard), a cursor control device 1214 (e.g., a mouse), a signal generation device 1220 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIGS. 1-4, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a drive configurable within a series of drives in a redundant array of independent disks (RAID) configuration, the drive comprising: 1) volatile memory and non-volatile memory (NVM); 2) a microcontroller coupled to the volatile and the NVM, the microcontroller to: a) extract a sequence number from a write command, wherein the sequence number corresponds to a write operation to write data to the series of drives in a RAID configuration; and b) write, to a history log (HLOG) stored in the volatile memory, an entry that includes: a logical-to-physical (L2P) address mapping between a logical address of the write command and a prior physical address written to the NVM for the logical address; and the sequence number extracted from the write command.

In Example 2, the drive of Example 1, wherein the write command is a first write command to a first physical address, the sequence number is a first sequence number, the logical address is a first logical address, and the prior physical address is a first prior physical address, and wherein, upon receipt of a second write command to the first logical address, the microcontroller is further to: a) remove the entry from the HLOG for the first logical address; and b) write a new entry to the HLOG that includes: a mapping between the first physical address and the first logical address, and a second sequence number extracted from the second write command.

In Example 3, the drive of Example 1, wherein the write command is one of a series of write commands associated with a set of instructions, and the microcontroller is further to, for each write command of the series of write commands: a) extract a sequence number; and b) store, in the HLOG as an HLOG entry, the L2P mapping with and in relation to a corresponding sequence number of the write command.

In Example 4, the drive of Example 3, wherein the microcontroller is to execute firmware to: a) in response to receipt of a commit sequence command, erase HLOG entries that have a sequence number below a specified sequence number, to reduce a size of the HLOG; and b) pause on a write-completion when the HLOG is full, to ensure a write is updated in the HLOG before erasing the HLOG entries that have a sequence number below the specified sequence number.

In Example 5, the drive of Example 1, further comprising 1) a capacitor operatively coupled to the volatile memory, the capacitor to store a charge that provides sufficient voltage to the volatile memory such that, in response to detection of a power failure imminent (PLI) event, the microcontroller is further to: a) retrieve the HLOG from the volatile; and b) write the HLOG to a location on the NVM.

In Example 6, the drive of Examples 1, wherein the HLOG comprises a circular first-in-first-out buffer, wherein the microcontroller is further to associate the HLOG with a lookup table that includes logical addresses, to facilitate searches of physical addresses within the HLOG.

In Example 7, the drive of Example 1, wherein the microcontroller is further to, in defragmenting the NVM: a) consider data as stale when there is no HLOG entry pointing to the data; and b) track a physical relocation of the data to which a more recent entry of the HLOG points.

In Example 8, the drive of Examples 1-7, wherein the series of drives are arranged in a RAID 4 configuration, a RAID 5 configuration or a RAID 6 configuration.

Various embodiments may have different combinations of the structural features described above. For instance, all optional features of the computing system described above may also be implemented with respect to the method or process described herein and specifics in the examples may be used anywhere in one or more embodiments.

Example 9 is a processor comprising: 1) a processor core to execute a drive array logic to: a) receive a plurality of write operations from a computing device, wherein each of the plurality of write operations targets a stripe on a series of drives in a redundant array of independent disks (RAID) configuration; b) assign a sequence number to respective ones of the plurality of write operations; and c) convert the respective ones of the plurality of write operations, including corresponding sequence numbers, to a multiple-drive write of the series of drives.

In Example 10, the processor of Example 9, wherein the sequence numbers monotonically increase over time as assigned to the plurality of write operations.

In Example 11, the processor of Example 9, wherein the sequence numbers are written to a history log (HLOG)

stored on each of the series of drives, wherein each HLOG includes entries of a logical-to-physical (L2P) mapping of a logical address and a prior physical address, and the sequence number extracted from a corresponding write command, and wherein the drive array logic is further to, in response to detecting a drive failure event of one of the series of drives and to restore parity consistency for a stripe: a) determine whether to use prior parity data or new parity data from a parity drive by comparing a sequence number in the HLOG on the parity drive for the stripe with a sequence number in the HLOG on a corresponding data drive for the stripe; and b) for each data drive, determine whether to use prior data or new data by comparing a sequence number in the HLOG for the data with the sequence number corresponding to parity data on the parity drive for the stripe.

In Example 12, the processor of Examples 9, wherein the drive array logic is further to send, to a drive of the series of drives, a commit sequence command to erase HLOG entries that have a sequence number below a specified sequence number, to reduce a size of the HLOG.

Various embodiments may have different combinations of the structural features described above. For instance, all optional features of the processors and methods described above may also be implemented with respect to a system described herein and specifics in the examples may be used anywhere in one or more embodiments.

Example 13 is a system comprising: 1) a series of drives in a redundant array of independent disks (RAID) configuration, wherein each drive of the series of drives stores a history log (HLOG) to track writes to the respective drive; and 2) a processor operatively coupled to the series of drives, the processor to execute drive array controller logic to: a) receive a write operation from a computing device; b) assign a sequence number to the write operation; and c) convert the write operation, including the sequence number, to a multiple-drive write command targeting a stripe of the series of drives, wherein a microcontroller on each drive of the series of drives is to: d) extract the sequence number from the write command; and e) write, to the HLOG of the drive, an entry that includes: a logical-to-physical (L2P) address mapping between a logical address of the write command and a prior physical address written to the drive for the logical address; and the sequence number extracted from the write command.

In Example 14, the system of Example 13, wherein the write command is a first write command to a first physical address, the sequence number is a first sequence number, the logical address is a first logical address, and the prior physical address is a first prior physical address, wherein upon receipt of a second write command to the first logical address, the microcontroller is further to: a) remove the entry from the HLOG for the first logical address; and b) write a new entry to the HLOG that includes a mapping between the first physical address and the first logical address, and a second sequence number extracted from the second write command.

In Example 15, the system of Example 13, wherein the HLOG is stored in volatile memory of each drive, further comprising a capacitor operatively coupled to the volatile memory of each drive, the capacitor to store a charge that provides sufficient voltage to the volatile memory such that, in response to detection of a PLI event, the microcontroller is further to: a) retrieve the HLOG from the volatile; and b) write the HLOG to a location on non-volatile memory of the drive.

In Example 16, the system of Example 13, wherein the drive array controller logic is further to, in response to detecting a drive failure event of one of the series of drives, and to restore parity consistency to a stripe: a) determine whether to use prior parity data or new parity data from a parity drive by comparing a sequence number in the HLOG on the parity drive for the stripe with a sequence number in the HLOG on a corresponding data drive for the stripe; and b) for each data drive, determine whether to use prior data or new data by comparing a sequence number in the HLOG for the data with the sequence number corresponding to parity data on the parity drive for the stripe.

In Example 17, the system of Example 13, wherein the write operation is one of a plurality of write operations associated with a set of instructions, and the drive array controller logic is further to: a) assign a sequence number to each of the plurality of write operations, wherein the sequence numbers monotonically increase over time as assigned to the plurality of write operations; and b) convert respective ones of the plurality of write operations, including corresponding sequence number, to a multiple-drive write command to the series of drives.

In Example 18, the system of Example 17, wherein the drive array controller logic is further to send, to a drive of the series of drives, a commit sequence command to erase HLOG entries that have a sequence number below a specified sequence number, to reduce a size of the HLOG of the drive, wherein the microcontroller of the drive is further to: a) in response to receipt of the commit sequence command, erase HLOG entries that have a sequence number below the specified sequence number; and b) pause on a write-completion when the HLOG is full, to ensure a write is updated in the HLOG before erasing the HLOG entries that have a sequence number below the specified sequence number.

In Example 19, the system of Example 17, wherein the microcontroller of each drive is further to, for each write command, when received: a) extract a sequence number; and b) store, in the HLOG as an HLOG entry, the L2P mapping with and in relation to a corresponding sequence number of the write command.

Various embodiments may have different combinations of the structural features described above. For instance, all optional features of the processors and methods described above may also be implemented with respect to a system described herein and specifics in the examples may be used anywhere in one or more embodiments.

Example 20 is a drive configurable within a series of drives in a redundant array of independent disks (RAID) configuration, the drive comprising: 1) primary non-volatile memory (NVM) and secondary NVM that is faster than the primary NVM; 2) a microcontroller coupled to the primary NVM and to the secondary NVM, the microcontroller to execute logic to: a) read a write command issued by a drive array controller; b) extract a sequence number from the write command, wherein the sequence number corresponds to a write operation received from a computing system to be written to the series of drives; and c) write, to a history log (HLOG) stored on the secondary memory, an entry that includes: a logical-to-physical (L2P) address mapping between a logical address of the write command and a prior physical address written to the primary NVM for the logical address; and the sequence number extracted from the write command.

In Example 21, the drive of Example 20, wherein the write command is a first write command to a first physical address, the sequence number is a first sequence number, the logical address is a first logical address, and the prior physical address is a first prior physical address, and wherein, upon receipt of a second write command to the first logical address, the microcontroller is further to execute the logic to: a) remove the entry from the HLOG for the first logical address; and b) write a new entry to the HLOG that includes: a mapping between the first physical address and the first logical address, and a second sequence number extracted from the second write command.

In Example 22, the drive of Example 20, wherein the write command is one of a series of write commands associated with a set of instructions, and the microcontroller is further to execute the logic to, for each write command of the series of write commands: a) extract a sequence number; and b) store, in the HLOG as an HLOG entry, the L2P mapping with and in relation to a corresponding sequence number of the write command.

In Example 23, the drive of Example 20, wherein the microcontroller is further to execute the logic to: a) in response to receipt of a commit sequence command, erase HLOG entries that have a sequence number below a specified sequence number, to reduce a size of the HLOG; and b) pause on a write-completion when the HLOG is full, to ensure a write is updated in the HLOG before erasing the HLOG entries that have a sequence number below the specified sequence number.

In Example 24, the drive of Example 20, wherein the HLOG comprises a circular first-in-first-out buffer, wherein the microcontroller is further to execute the logic to associate the HLOG to with a lookup table that includes logical addresses, to facilitate searches of physical addresses within the HLOG.

In Example 25, the drive of Example 20, wherein the microcontroller is further to execute the logic to, in defragmenting the NVM: consider data as stale when there is no HLOG entry pointing to the data; and track a physical relocation of the data to which a more recent entry of the HLOG points.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, operation and the like in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to efficient and cost-effective solutions to a redundant array of independent disks (RAID) write hole in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor or SoC, other embodiments are applicable to other types of integrated circuits and logic devices, including a drive array controller and a RAID device. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A drive configurable within a series of drives in a redundant array of independent disks (RAID) configuration, the drive comprising:
   volatile memory and non-volatile memory (NVM);
   a microcontroller coupled to the volatile and the NVM, the microcontroller to, in response to receipt of a write command from a computing device:
      extract a sequence number from the write command, wherein the sequence number corresponds to a write order of a write operation that is to write data to the series of drives in the RAID configuration;
      determine, from the write command, a logical address to which the write command is directed;

extract, from a history log (HLOG) stored in the volatile memory, a prior physical address written to the NVM for the logical address;

write, to the HLOG, an entry that includes: a logical-to-physical (L2P) address mapping between the logical address of the write command and the prior physical address written to the NVM for the logical address; and the sequence number extracted from the write command; and responsive to detection of a power-loss-imminent (PLI) event of the series of drives, write the HLOG from the volatile memory to the NVM, wherein the HLOG remains in the NVM after the PLI event for use in restoring data of a failed drive of the series of drives.

2. The drive of claim 1, wherein the write command is a first write command to a first physical address, the sequence number is a first sequence number, the logical address is a first logical address, and the prior physical address is a first prior physical address, and wherein, upon receipt of a second write command to the first logical address, the microcontroller is further to:

remove the entry from the HLOG for the first logical address; and write a new entry to the HLOG that includes: a mapping between the first physical address and the first logical address, and a second sequence number extracted from the second write command.

3. The drive of claim 1, wherein the write command is one of a series of write commands associated with a set of instructions, and the microcontroller is further to, for each write command of the series of write commands:

extract a sequence number; and store, in the HLOG as an HLOG entry, the L2P mapping with and in relation to a corresponding sequence number of the write command.

4. The drive of claim 3, wherein the microcontroller is to execute firmware to:

in response to receipt of a commit sequence command, erase HLOG entries that have a sequence number below a specified sequence number, to reduce a size of the HLOG; and pause on a write-completion when the HLOG is full, to ensure the write command is updated in the HLOG before erasing the HLOG entries that have a sequence number below the specified sequence number.

5. The drive of claim 1, further comprising a capacitor operatively coupled to the volatile memory, the capacitor to store a charge that provides sufficient voltage to the volatile memory such that, in response to detection of the PLI event, the microcontroller is further to:

retrieve the HLOG from the volatile memory; and write the HLOG to a location in the NVM.

6. The drive of claim 1, wherein the HLOG comprises a circular first-in-first-out buffer, wherein the microcontroller is further to associate the HLOG with a lookup table that includes logical addresses, to facilitate searches of physical addresses within the HLOG.

7. The drive of claim 1, wherein the microcontroller is further to, in defragmenting the NVM:

consider data as stale when there is no HLOG entry pointing to the data; and track a physical relocation of the data to which a more recent entry of the HLOG points.

8. The drive of claim 1, wherein the series of drives are arranged in one of a RAID 4 configuration, a RAID 5 configuration or a RAID 6 configuration.

9. A processor comprising:

a processor core to execute a drive array logic to:

receive a plurality of write operations from a computing device, wherein a write operation of the plurality of write operations targets a stripe on a series of drives in a redundant array of independent disks (RAID) configuration;

assign a sequence number to the write operation, wherein the sequence number corresponds to a write order of respective ones of the plurality of write operations and is written to a history log (HLOG) stored on the series of drives, the HLOG including entries of a logical-to-physical (L2P) mapping of a logical address and a prior physical address, and the sequence number of the write operation;

convert the write operation, including the sequence number, to a multiple-drive write of the series of drives, wherein the multiple-drive write is formatted to write to the stripe on the series of drives, which is treated as a single logical drive; and responsive to detecting a drive failure event of a failed drive of the series of drives, issue an HLOG retrieval command to obtain the HLOG for use in restoration of data from the failed drive.

10. The processor of claim 9, wherein the processor is further to assign a sequence number to respective ones of the plurality of write operations such that the sequence numbers monotonically increase over time.

11. The processor of claim 10, wherein the sequence numbers are written to the HLOG stored on each of the series of drives, and wherein the processor core is further to, in response to detecting the drive failure event and to restore parity consistency for the stripe:

determine whether to use prior parity data or new parity data from a parity drive, of the series of drives, by comparing a sequence number in the HLOG on the parity drive for the stripe with a sequence number in the HLOG on a corresponding data drive for the stripe; and for each data drive of the series of drives, determine whether to use prior data or new data by comparing a sequence number in the HLOG for the data with the sequence number corresponding to parity data on the parity drive for the stripe.

12. The processor of claim 9, wherein the processor core is further to send, to a drive of the series of drives, a commit sequence command to erase HLOG entries that have a sequence number below a specified sequence number, to reduce a size of the HLOG.

13. A system comprising:

a series of drives in a redundant array of independent disks (RAID) configuration, wherein each drive of the series of drives stores a history log (HLOG) in volatile memory to track writes to the respective drive of the series of drives; and a processor operatively coupled to the series of drives, the processor to execute drive array controller logic to:

receive a write operation from a computing device;

assign a sequence number to the write operation, wherein the sequence number corresponds to a write order of respective ones of a plurality of write operations; and convert the write operation, including the sequence number, to a multiple-drive write command targeting a stripe of the series of drives, wherein the multiple-drive write command is formatted to write to the stripe on the series of drives, which is treated as a single logical drive;

wherein a microcontroller on a drive of the series of drives is to, in response to receipt of the multiple-drive write command:
    extract the sequence number from the multiple-drive write command;
    determine, from the multiple-drive write command, a logical address to which the multiple-drive write command is directed;
    extract, from the HLOG stored in the volatile memory of the drive, a prior physical address written to non-volatile memory (NVM) of the drive for the logical address;
    write, to the HLOG of the drive, an entry that includes: a logical-to-physical (L2P) address mapping between the logical address of the multiple-drive write command and the prior physical address written to the drive for the logical address; and the sequence number extracted from the multiple-drive write command; and
    responsive to detection of a power-loss-imminent (PLI) event of the series of drives, write the HLOG from the volatile memory to the NVM, wherein the HLOG remains in the NVM after the PLI event for use in restoring data of a failed drive of the series of drives.

14. The system of claim 13, wherein the multiple-drive write command is a first write command to a first physical address, the sequence number is a first sequence number, the logical address is a first logical address, and the prior physical address is a first prior physical address, wherein upon receipt of a second write command to the first logical address, the microcontroller is further to:
    remove the entry from the HLOG for the first logical address; and
    write a new entry to the HLOG that includes a mapping between the first physical address and the first logical address, and a second sequence number extracted from the second write command.

15. The system of claim 13, further comprising a capacitor operatively coupled to the volatile memory of the drive, the capacitor to store a charge that provides sufficient voltage to the volatile memory such that, in response to detection of the PLI event, the microcontroller is further to:
    retrieve the HLOG from the volatile memory; and
    write the HLOG to a location in the NVM of the drive.

16. The system of claim 13, wherein the processor is further to, in response to detecting a drive failure event of the failed drive of the series of drives, and to restore parity consistency to the stripe:
    determine whether to use prior parity data or new parity data from a parity drive, of the series of drives, by comparing a sequence number in the HLOG on the parity drive for the stripe with a sequence number in the HLOG on a corresponding data drive for the stripe; and
    for each data drive of the series of drives, determine whether to use prior data or new data by comparing a sequence number in the HLOG for the data with the sequence number corresponding to parity data on the parity drive for the stripe.

17. The system of claim 13, wherein the write operation is one of a plurality of write operations associated with a set of instructions, and the processor is further to:
    assign a sequence number to each of the plurality of write operations such that the sequence numbers monotonically increase over time; and
    convert respective ones of the plurality of write operations, including corresponding sequence number, to a second multiple-drive write command to the series of drives.

18. The system of claim 17, wherein the processor is further to send, to a drive of the series of drives, a commit sequence command to erase HLOG entries that have a sequence number below a specified sequence number, to reduce a size of the HLOG of the drive, wherein the microcontroller of the drive is further to:
    in response to receipt of the commit sequence command, erase HLOG entries that have a sequence number below the specified sequence number; and
    pause on a write-completion when the HLOG is full, to ensure the second multiple-drive write command is updated in the HLOG before erasing the HLOG entries that have a sequence number below the specified sequence number.

19. The system of claim 17, wherein the microcontroller of each drive is further to, for each multiple-drive write command, when received:
    extract a sequence number; and
    store, in the HLOG as an HLOG entry, the L2P mapping with and in relation to a corresponding sequence number of the multiple-drive write command.

20. A drive configurable within a series of drives in a redundant array of independent disks (RAID) configuration, the drive comprising:
    primary non-volatile memory (NVM) and secondary NVM that is faster than the primary NVM;
    a microcontroller coupled to the primary NVM and to the secondary NVM, the microcontroller to execute logic to:
        read a write command issued by a drive array controller;
        extract a sequence number from the write command, wherein the sequence number corresponds to an order of a write operation received from a computing system to be written to the series of drives;
        determine, from the write command, a logical address to which the write command is directed;
        extract, from a history log (HLOG) stored in the secondary NVM, a prior physical address written to the primary NVM for the logical address;
        write, to the HLOG, an entry that includes: a logical-to-physical (L2P) address mapping between the logical address of the write command and the prior physical address written to the primary NVM for the logical address; and the sequence number extracted from the write command; and
        responsive to detection of a power-loss-imminent (PLI) event of the series of drives, write the HLOG from the secondary NVM to the primary NVM, wherein the HLOG remains in the primary NVM after the PLI event for use in restoring data of a failed drive of the series of drives.

21. The drive of claim 20, wherein the write command is a first write command to a first physical address, the sequence number is a first sequence number, the logical address is a first logical address, and the prior physical address is a first prior physical address, and wherein, upon receipt of a second write command to the first logical address, the microcontroller is further to execute the logic to:
    remove the entry from the HLOG for the first logical address; and
    write a new entry to the HLOG that includes: a mapping between the first physical address and the first logical address, and a second sequence number extracted from the second write command.

22. The drive of claim 20, wherein the write command is one of a series of write commands associated with a set of instructions, and the microcontroller is further to execute the logic to, for each write command of the series of write commands:
   extract a sequence number; and
   store, in the HLOG as an HLOG entry, the L2P mapping with and in relation to a corresponding sequence number of the write command.

23. The drive of claim 22, wherein the microcontroller is further to execute the logic to:
   in response to receipt of a commit sequence command, erase HLOG entries that have a sequence number below a specified sequence number, to reduce a size of the HLOG; and
   pause on a write-completion when the HLOG is full, to ensure the write command is updated in the HLOG before erasing the HLOG entries that have a sequence number below the specified sequence number.

24. The drive of claim 20, wherein the HLOG comprises a circular first-in-first-out buffer, wherein the microcontroller is further to execute the logic to associate the HLOG with a lookup table that includes logical addresses, to facilitate searches of physical addresses within the HLOG.

25. The drive of claim 20, wherein the microcontroller is further to execute the logic to, in defragmenting the NVM:
   consider data as stale when there is no HLOG entry pointing to the data; and
   track a physical relocation of the data to which a more recent entry of the HLOG points.

* * * * *